United States Patent [19]
May et al.

[11] 3,929,444
[45] Dec. 30, 1975

[54] APPARATUS FOR MAKING FLAT GLASS INCLUDING AN EDGE STRETCHING APPARATUS

[75] Inventors: Earl L. May, Irwin; Joseph J. Fisher, Oakmont, both of Pa.

[73] Assignee: PPG Industries, Inc., Pittsburgh, Pa.

[22] Filed: Mar. 6, 1974

[21] Appl. No.: 448,786

[52] U.S. Cl. .................. 65/182 R; 65/91; 65/200; 65/245; 65/253
[51] Int. Cl.² .................. C03B 17/00; C03B 19/00
[58] Field of Search ........ 65/99 A, 182 R, 65 A, 91, 65/199–201, 245, 253

[56] References Cited
UNITED STATES PATENTS

| | | | |
|---|---|---|---|
| 3,653,869 | 4/1972 | Biagini | 65/182 R |
| 3,709,673 | 1/1973 | Bishop | 65/182 R |
| 3,713,797 | 1/1973 | Lawrenson | 65/91 |

Primary Examiner—Robert L. Lindsay, Jr.
Attorney, Agent, or Firm—E. Kears Pollock

[57] ABSTRACT

An edge-roll machine for contacting a marginal portion of a body of glass being formed into a continuous sheet of glass while floating on molten metal is movably mounted on an overhead rail so as to eliminate entanglement with coolant supply conduits and to provide free access along the floor about a chamber in which the glass is formed.

6 Claims, 4 Drawing Figures

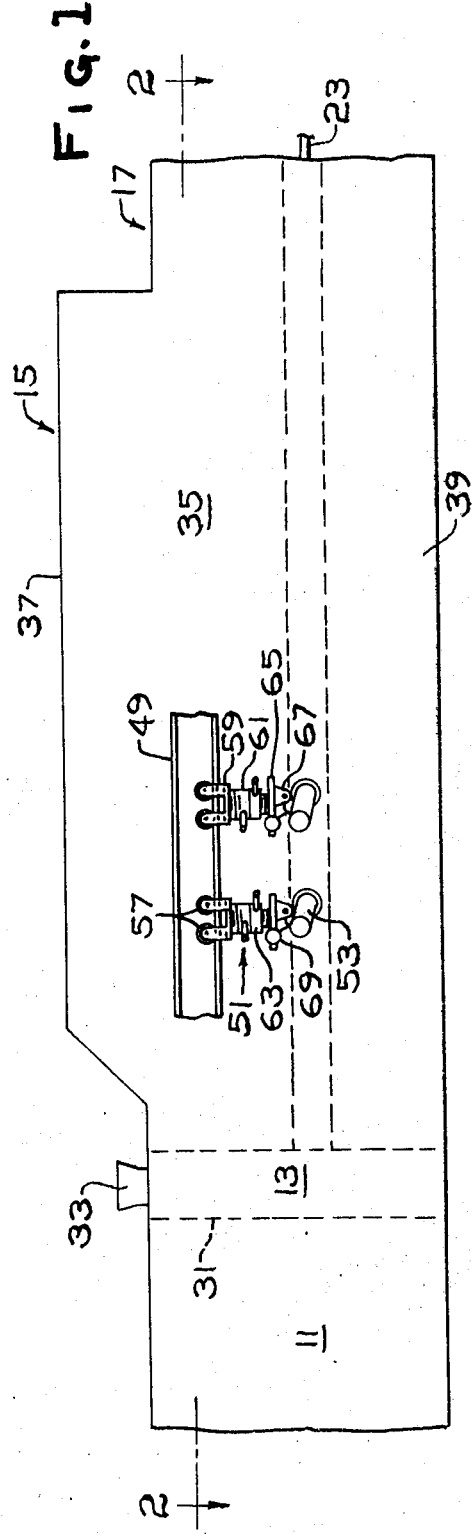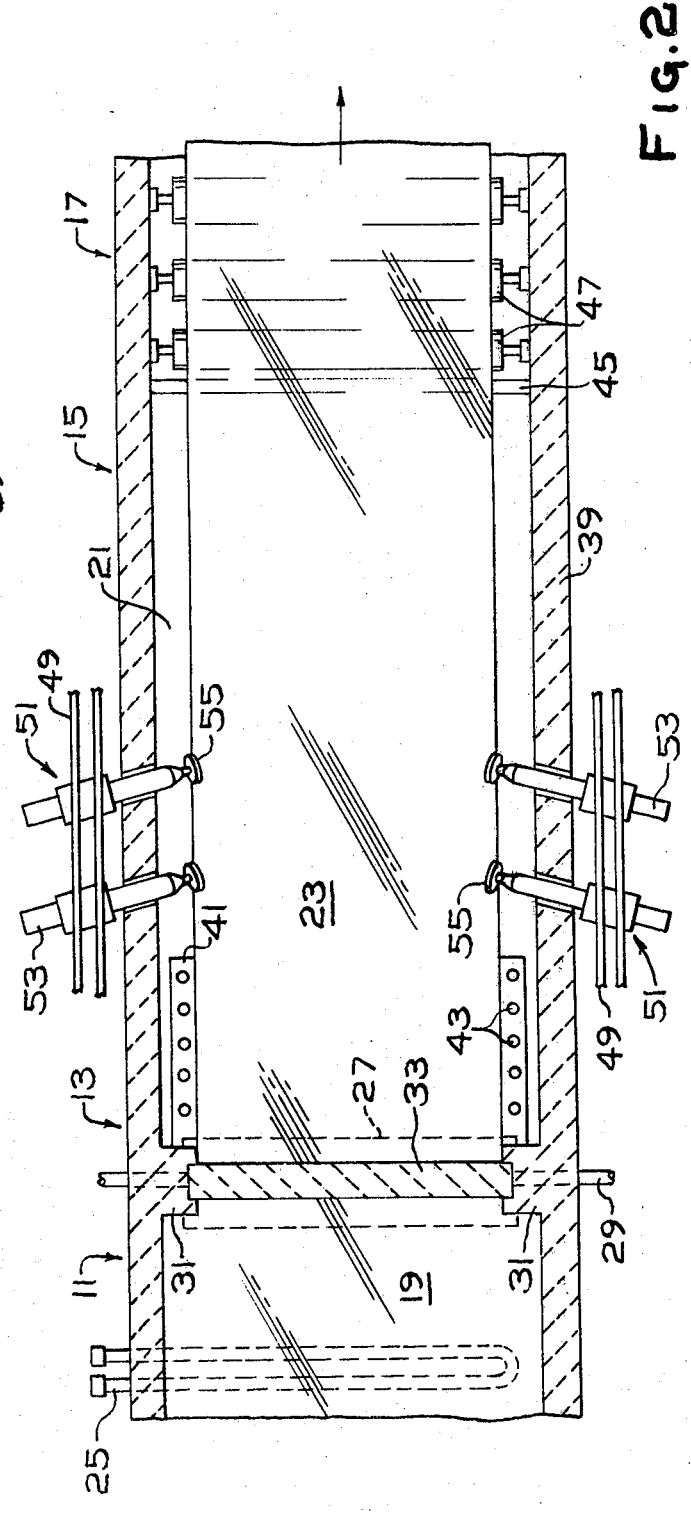

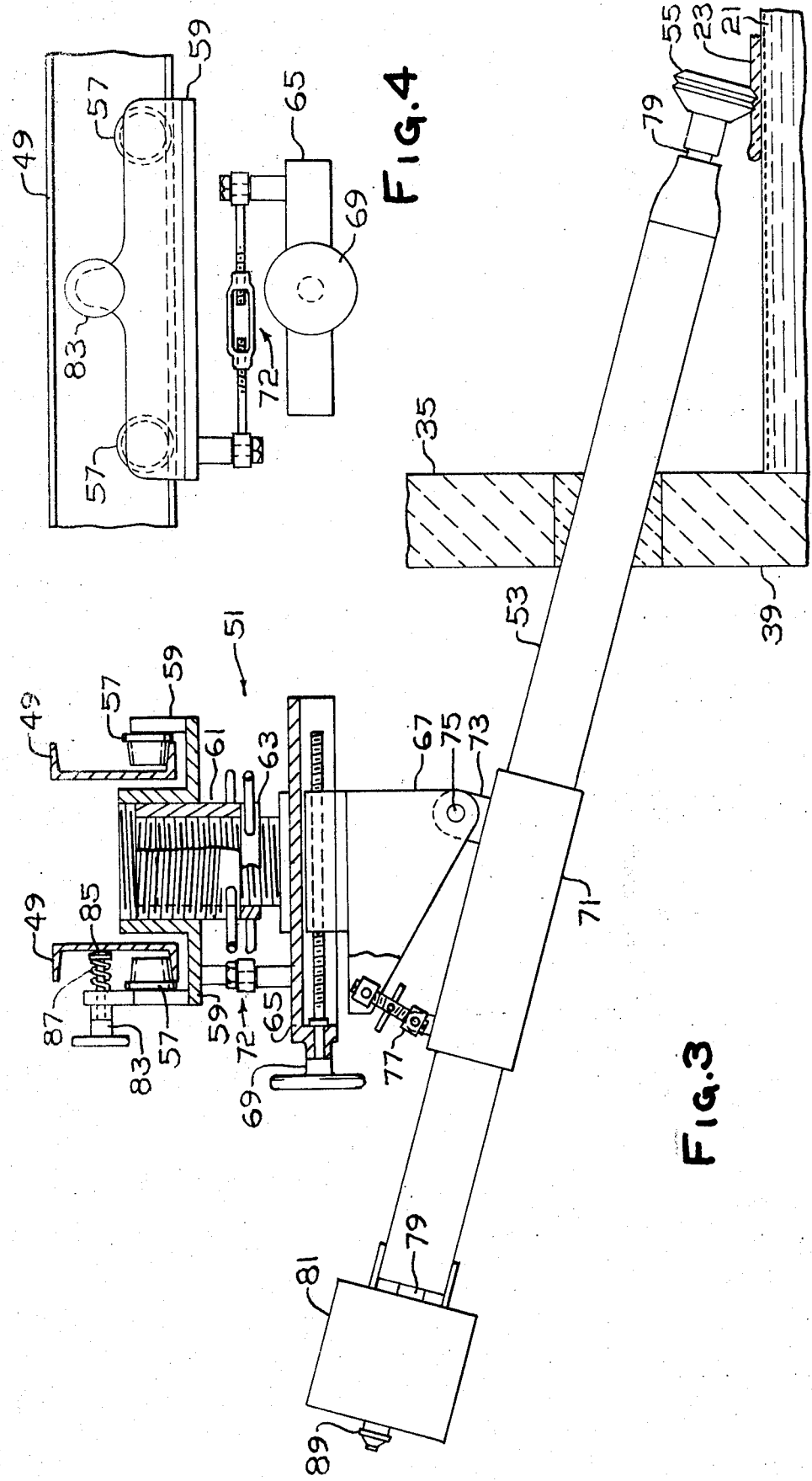

APPARATUS FOR MAKING FLAT GLASS INCLUDING AN EDGE STRETCHING APPARATUS

BACKGROUND OF THE INVENTION

1. Field of the Invention

This invention relates to apparatus for applying forces to glass being formed into a continuous sheet of glass while floating on molten metal, particularly related to the manufacture of thin or extra thin glass and relates more particularly to apparatus for supporting edge-engaging members employed to apply forces to the glass.

2. Description of the Prior Art

The following Unites States patents describe devices and methods of applying forces to glass while the glass is floating on molten metal in order to form continuous sheets of glass that are thinner than the thickness of glass which is permitted to float on a molten metal, such as tin, to an equilibrium thickness.

U.S. Pat. no. 3,492,109 to Robinson et al teaches the use of a glass-engaging edge roll that is supported on the end of a long shaft or barrel such that it may be rotated against a marginal portion of a body of molten glass and thereby apply forces to the glass.

U.S. Pat. No. 3,493,359 to Lawrenson discloses a similar device which is provided with internal water cooling for the long shaft or barrel supporting the edge roll.

U.S. Pat. No. 3,709,673 to Bishop describes a particular edge-roll machine which is provided with internal cooling and a series of lubricious heat-resisting bushings so that the roll is particularly stable and does not cause the edge roll to severely damage the glass with which it is in contact beyond the immediate region of the roll itself.

U.S. Pat. No. 3,533,772 to Itakura et al discloses rolls for engaging the bottom surface of the body of glass along its marginal portions. These roll are also mounted onto elongated shafts or barrels which may be rotated.

U.S. Pat. No. 3,563,720 to Ito et al discloses the use of edge-engaging means other than rollers. In particular, gas permeable porous refractory engaging means which are ribbed along their bottom surface are provided to engage the upper surface of a floating body of molten glass.

All of these patents are hereby incorporated by reference in this application to show specific glass-engaging means for applying forces to the glass being formed. The present invention is suitable to be used in combination with any of these glass-engaging means.

SUMMARY OF THE INVENTION

An apparatus is provided for making flat glass comprising a chamber containing a pool of molten metal upon which the glass is supported while being formed into a continuous sheet of glass. The apparatus includes devices for engaging a marginal portion of the body of glass floating on the molten metal to prevent the glass from flowing to its equilibrium thickness. These devices may be used to maintain the thickness and width of the body of glass as desired by production needs. The thickness of the glass may be maintained at a thickness either greater than equilibrium thickness or less than equilibrium thickness, although the invention is most particularly beneficial for making glass much less than equilibrium thickness of the order of ⅛-inch thickness or less.

The devices used with a forming chamber to engage the glass and maintain its width and thickness include structural supporting means located outside the forming chamber. Such structural support means are located at an elevation above the elevation of the pool of molten metal within the chamber so that the remaining portion of the device may depend therefrom. A suitable structural support may be a rail such as can be constructed from conventional structural steel channel members. Such a rail is preferably mounted in a substantially horizontal position and is substantially parallel to a side wall of the glass forming chamber. In this way the rail extends along the side of the forming chamber in a direction that is substantially parallel to the intended direction of movement for a continuous sheet of glass moving through the chamber.

A carriage is mounted on the structural support and generally depends from it in a downwardly extending direction. The carriage may be mounted in fixed relation to the structural support but is preferably movably mounted with respect thereto so that it may be translated along the structural support to a desired location along the length of the forming chamber according to particular production needs associated with the making of glass of any desired thickness.

An elongated member is mounted on the carriage and extends through a side wall of the chamber and over the pool of molten metal. Such an elongated member is preferably a tubular member as fully described in U.S. Pat. No. 3,709,673 to Bishop. The complete description of the tubular member or barrel of the devices shown in that patent is incorporated by reference herein.

Mounted on the end of the elongated member is a glass-engaging member. The glass-engaging member may be a top edge roll as described in the patent to Bishop or a top edge roll as described in the patent to Lawrenson, or may be a top edge roll as described in the patent to Ito et al. Alternatively, the glass-engaging member may be a bottom edge roll as described in the patent to Itakura et al, or may be a non-rolling, gripping edge member as described in the patent to Ito et al. As stated before, all these patents are incorporated by reference herein inasmuch as they disclose glass-engaging means that may be used in combination with the present invention.

The preferred glass-engaging means is a simple edge roll as described in the patent to Bishop. The edge roll is generally connected to a shaft which may be rotated in order to apply suitable transverse and longitudinal forces to the body of glass engaged by the edge roll. Throughout the present discussion, the term "longitudinal" shall mean the direction substantially parallel to the intended direction of glass movement through the forming chamber from an upstream end to a downstream end of the chamber, while "transverse" shall mean a direction substantially perpendicular to the intended direction of glass movement and generally extending across the forming chamber from one side wall to the other.

As already stated, the carriage of the present apparatus is preferably movably mounted with respect to the structural support. The apparatus is preferably provided with means for locking the position of the carriage with respect to the structural support so that inadvertent movement does not occur during the use of the apparatus to make flat glass.

The carriage of the apparatus preferably includes means for elevating the elongated member with respect to the structural support. Such means permit the elongated member and thus the glass-engaging member to be elevated upward or downward with respect to the structural support so that the glass-engaging means may be moved upward or downward with respect to the pool of molten metal. In this way the glass-engaging means may be raised above the body of glass on the molten metal to be disengaged from it from time to time in order to make adjustments of the process as desired. The elevating means of the carriage in combination with other elements of the carriage will be further described below. It also permits maintaining the elevation of the glass-engaging means while adjusting the transverse position of the glass-engaging means. This permits the glass-engaging means to be maintained at a proper elevation with respect to the pool of molten metal while moved inward or outward from the center of the chamber to accommodate bodies of glass having differing widths. The elevating means of the carriage is preferably a telescoping assembly comprising a theaded fixed portion, a threaded movable portion and a center portion having interval and external threads which may be rotated with respect to the other two threaded portions in the manner of a turnbuckle to raise or lower the movable member of the carriage. Alternatively, a scissors-jack arrangement or any other equivalent may be employed as an elevating mechanism for the carriage.

The carriage is further provided with means of adjusting the position of the glass-engaging means with respect to the carriage. Elements of this assembly include means for varying the position of the glass-engaging means in all three spatial dimensions. In particular, the carriage is provided with means for moving the elongated member translatably with respect to the movable member of the carriage and the elongated member is mounted on this member by an angularly movable member connected thereto. This may be a pivotable bracket member or any equivalent thereof.

In a particularly preferred embodiment of this invention, a forming chamber is provided that is of approximately constant width along its entire length, and a common rail (or plurality of rails) is used to support a plurality of carriages with their respective elongated members and glass-engaging members. Each side wall of the chamber is provided with a space between a top or roof and side wall portion and a bottom portion which is easily accessible so that elongated members in the devices may be extended through the side wall at a virtually infinite number of locations along the length of the forming chamber.

The apparatus according to this invention, unlike the glass edge stretching devices of the past, provides free access to each of the devices and keeps the floor spaces adjacent the side walls of a forming chamber relatively free and accessible. This permits the use of more glass-engaging devices or the placement of glass-engaging devices more closely spaced to one another than was possible in the past. Further, the apparatus of this invention is significantly easier to use and adjust because of its accessibility than the devices of the prior art. Therefore, operators of a glassmaking process find it easier to adjust the control the glassmaking process to make glass of any width and thickness by employing the apparatus of this invention.

BRIEF DESCRIPTION OF THE DRAWINGS

FIG. 1 is a partial longitudinal elevation of a glass forming apparatus employing the present invention;

FIG. 2 is a partial sectional plan view of an apparatus according to this invention taken along section line 2—2 of FIG. 1;

FIG. 3 is an elevational view of a single glass stretching apparatus employed in the apparatus according to this invention; and FIG. 4 is a partial elevational view of an alternative locking mechanism to prevent the rotational movement of a single glass stretching apparatus.

DESCRIPTION OF THE PREFERRED EMBODIMENT

Referring now to FIGS. 1 and 2, ther is shown a flat glassmaking apparatus including a glass furnace or tank terminating in a refiner 11 to which there is connected a molten glass delivery means 13, which in turn is connected to a glass forming chamber 15, and that to a glass sheet take-out apparatus 17. Molten glass 19 in the refiner 11 is delivered onto a pool of molten metal 21 in the glass forming chamber 15. This glass is then cooled and stretched to form a dimensionally stable continuous sheet of flat glass which is taken from the forming chamber 15 by the take-out apparatus 17.

Molten glass 19 in the refiner 11 is generally conditioned for delivery and forming by being cooled, for example, by a submerged cooler 25, as shown.

Molten glass 19 is caused to flow, in a preferred embodiment of this invention, over a threshold 27 directly onto the molten metal 21. The present invention is, however, not limited to a combination including this particular delivery means and, alternatively, glass may be delivered by a delivery means such as described in U.S. Pat. No. 3,220,816 to Pilkington, wherein the glass is delivered down the long canal over a lip and caused to fall onto the pool of molten metal where it is generally permitted to spread.

The threshold 27 is preferably provided with means for cooling the threshold 29, such as cooling pipes embedded through the threshold transverse to the movement of glass over the threshold. In addition to the threshold 27, the delivery means 13 also includes side members or jambs 31 that define the side boundaries of the channel through which molten glass may flow. The delivery means 13 further includes a metering member or tweel 33 extending downwardly toward the threshold 27. The tweel 33 engages the molten glass and controls the cross-sectional area of space defined by the tweel, threshold and jamb through which molten glass may flow onto the molten metal in the forming chamber.

The forming chamber 15 includes a pair of side walls 35. In a preferred embodiment of this invention, the side walls 35 are generally parallel to one another and parallel to the direction of glass movement, as shown by the arrow in FIG. 2. Nevertheless, the present invention is applicable to forming chambers having conventional "shoulder" structure. The forming chamber includes a roof portion 37. The roof portion 37 and the side walls 35 form along with the ends of the chamber a space above the molten metal which is a atmosphere space, filled with a protective atmosphere to prevent oxidation of the molten metal. The gases in the atmosphere may be inert gases, reducing gases, or a combination of inert and reducing gases. The forming chamber a bottom or container portion 39 for containing the molten metal 21. The bottom portion 39 includes a side portion of the bottom extending above the elevation of the surface of molten metal in the chamber. The bottom portion is generally supported on a structure beneath the forming chamber. The roof portion 37 of the forming chamber and the side walls 35 generally form a single structure that is suspended from supporting members extending above the chamber. A space relatively free of structural members separates the side walls 35 from the bottom portion 39 of the chamber substantially along the length of the side wall 35. This space is sealed during operation of the apparatus but is sufficiently accessible to provide a plurality of locations through which devices may be extended into the forming chamber from outside the chamber or to provide locations for observation windows along the length of the forming chamber.

Inside the forming chamber 15 there may optionally be located guide members 41 extending from the vicinity of the delivery means 13 downstream to the forming chamber 15. These guides may be provided with means for controlling their temperature 43, such as heaters or coolers. Electric heaters are useful for controlling the temperature of such guides.

At the downstream end of the forming chamber 15 is an end dam 45, which serves to contain the molten metal within the forming chamber and to separate the forming chamber 15 from the take-out apparatus 17. The take-out apparatus 17, generally housed within the same structure as the forming chamber, comprises take-out rolls 47, which serve to lift a continuous sheet of glass up from the molten metal and apply sufficient tractive forces to the glass to convey it out from the forming chamber into a lehr or other conventional processing equipment. In addition to the take-out rolls 47, the take-out apparatus generally includes a seal (not shown). The seal will usually be one or more flexible heat-resisting curtains of mineral fiber, such as asbestos curtain, hanging down from a roof portion of the structure above the take-out rolls down to a location for contacting a continuous sheet of glass being drawn from the chamber.

Some elements of the present novel combination are located external to the forming chamber itself. A supporting member, such as one or more rails 49, extends along the side of the forming chamber at an elevation generally above an elevation of the molten within the chamber and preferably at an elevation sufficient to provide reasonable access to workers beneath the rail. The rails 49 are connected to supporting structure (not shown). The rails preferably extend a substantial distance along the length of the chamber, usually parallel to a side wall of the chamber. Mounted on a support member 49 is a carriage 51. Mounted on the carriage 51 is an elongated member 53 which extends into the forming chamber generally through the space between the side walls and the bottom container portion of the chamber. Mounted on the elongated member 53 is a glass-engaging member for imparting forces to a body of glass in the chamber or for resisting movement of the glass due to the imposition of forces at other locations.

The carriage 51 is preferably mounted on the support member 49 so that it may be moved with respect to the support member 49. A suitable combination of elements a support member comprising one or more channel members or rails with a carriage having wheels 57 which rest on the rails so that the carriage may be translated along the rails. Of course, other means for translating the carriage with respect to the rails may be employed. The carriage 51 includes a frame 59 on which there is mounted means for elevating the elongated member that is connected to the carriage.

The elevating means 61 is preferably a telescoping device, such as a combination of threaded members having an intermediate member that is threaded both inside and out with the threads having opposing pitches so that turning of such a member causes the remaining members of the telescoping means to move with respect to one another. The telescoping means could be replaced with other elevating means such as a scissors-jack or the like. The preferred elevating means, which is a telescoping means 61, is provided with means for locking it at a fixed elevation 63, such as the lock ring as shown. It will be apparent with reference to the preferred embodiment that a telescoping means, such as shown, also provides means for rotating the bottom portion of the carriage with respect to the top portion of the carriage so that the angular orientation of the elongated member of the device as seen in the plan view may be altered with respect to the orientation of the supporting rails.

Connected to the elevating means 61 is a mounting platform 65, which is provided with a mounting bracket 67 that may be translatably moved with respect to the mounting platform 65 by means of a translation adjustment means, such as a threaded shaft 69. Connected to the mounting bracket 67 is a collar 71, which is connected by means of a flange mounting 73 and a pin 75 permitting the collar to be angularly movable with respect to the mounting bracket 67. The collar is further connected to the bracket 67 by means of an angular adjustment shaft 77, which is threaded, and is provided means for adjusting the length of the shaft 77 extending between the bracket 67 and the collar 71 in order to adjust the angle of one with respect to the other. The elongated member 53 of the device is mounted on the carriage by being surrounded by the collar 71.

While a locking ring 63 is generally satisfactory for preventing movement of the lower portion of the apparatus, it may be supplemented by additional locking means to prevent rotational movement. For example, a locking mechanism such as shown in FIG. 4 (and with its location shown in the apparatus of FIG. 3) may be provided. The frame 59 and the mounting platform 65 are connected through a turnbuckle 72, which may be adjusted to accommodate rotational movement of the platform 65 with respect to the frame 59. The turnbuckle 72 then positively holds the frame 59 and the platform 65 in a fixed relationship to one another.

The elongated member of the device includes, in a preferred embodiment of the invention, the element shown in the patent to Bishop, which has been incorporated by reference in this application. In particular, the elongated device includes a shaft 79 on which the glass-engaging member 55 is mounted. The shaft 79 is rotatable so that the glass-engaging member, which is preferably an edge roll, may be rotated to impart forces to the body of glass 23 that is supported by the molten metal 21 in the forming chamber. The elongated member is further provided with means for rotating the shaft 79, such as a motor gear box combination 81.

The present device may be provided with means for rapidly lifting the barrel and the glass-engaging member 55 from the glass in the event of an emergency. The angular adjustment shaft 77 may be replaced by or connected in line to a hydraulic or pneumatic piston which can be activated remotely to lift the glass-engaging member 55 from the glass.

Means are provided for locking the position of the carriage with respect to the rails. The carriage, for example, may be provided with a threaded shaft 83 having a friction cap 85 mounted on its end, and this may be spring loaded with a spring 87 against the frame of the carriage. When driven against the rail 49, this shaft prevents the movement of the carriage with respect to the rail.

Mounted on the end of the elongated member 53 is a connection such as a rotary union 89 for connecting coolant lines to the elongated member. With the internal structure of the preferred elongated member, such as that shown in the patent to Bishop, coolant is supplied to the elongated member through such coolant lines to cool it. The carriage and the elongated member connected to it may be readily moved even if connecting coolant lines are permitted to hang down from the rotary union 89 onto a floor space in the vicinity of the side walls of the chamber, since, unlike the apparatus employed in the past, the carriage and elongated member according to this invention are supported up out of the way of such coolant lines.

As will be apparent to those skilled in the art, the present apparatus may be modified and equivalent elements may be employed in the combination and without departing from the spirit of this invention.

Thus, the present disclosure of the preferred embodiments of the present invention is not intended to limit the scope of the applicants' invention, which is claimed as follows:

1. In an apparatus for making flat glass wherein the position of a marginal portion of a body of glass supported on a pool of molten metal in a chamber in controlled to establish and maintain a desired width and thickness of the glass, the combination comprising:
   a. structural support means mounted outside the chamber at an elevation above the pool of molten metal;
   b. a carriage including a carriage frame, adjustable mounting means, and a mounting platform mounted on and depending downwardly from the structural support means;
   c. an elongated member mounted on the mounting platform of the carriage and being extendable beneath the support means, through a side wall of the chamber and over the pool of molten metal; and
   d. means for engaging glass supported on the pool of molten metal mounted on the elongated member and providing means for applying a force to the glass, wherein
   the adjustable mounting means of the carriage comprises means for elevating the mounting platform and the elongated member, means for rotating the mounting platform and the elongated member and means for locking the position of the mounting platform with respect to the carriage frame whereby the elevation and the plan orientation of the elongated member may be adjusted and maintained with respect to the structural support means.

2. The apparatus according to claim 1 wherein the structural support means comprises a rail extending substantially along a line parallel to an intended direction of glass movement through the chamber and wherein the carriage is movably mounted on the structural support means.

3. The apparatus according to claim 2 further comprising means for locking the position of the carriage with respect to the rail.

4. The apparatus according to claim 1 wherein the elongated member is substantially tubular and the means for applying a force to the glass comprises means for rotating the elongated member and the glass-engaging means mounted thereon about an axis of the elongated member.

5. The apparatus according to claim 1 wherein the elevating means is a telescoping means.

6. The apparatus according to claim 1 wherein the elongated member is provided with means for cooling it.

* * * * *

UNITED STATES PATENT OFFICE
CERTIFICATE OF CORRECTION

PATENT NO. : 3,929,444
DATED : December 30, 1975
INVENTOR(S) : Earl L. May and Joseph J. Fisher It is certified that error appears in the above-identified patent and that said Letters Patent are hereby corrected as shown below:

Column 7, line 38, "in" (second occurrence) should be --is--.

Signed and Sealed this thirtieth Day of March 1976

[SEAL]

Attest:

RUTH C. MASON
Attesting Officer

C. MARSHALL DANN
Commissioner of Patents and Trademarks